United States Patent [19]

Kuriyama

[11] Patent Number: 5,759,134
[45] Date of Patent: Jun. 2, 1998

[54] CONTROL SYSTEM FOR AUTOMATIC TRANSMISSION

[75] Inventor: Minoru Kuriyama, Hiroshima, Japan

[73] Assignee: Mazda Motor Corporation, Hiroshima, Japan

[21] Appl. No.: 685,837

[22] Filed: Jul. 24, 1996

[30] Foreign Application Priority Data

Jul. 25, 1995 [JP] Japan ................................. 7-209925
Jun. 28, 1996 [JP] Japan ................................. 8-188680

[51] Int. Cl.⁶ ................................................ F16H 61/00
[52] U.S. Cl. ................................................ 477/158
[58] Field of Search ................................ 477/158, 163

[56] References Cited

U.S. PATENT DOCUMENTS

| | | | |
|---|---|---|---|
| 5,107,725 | 4/1992 | Takahashi | 477/158 |
| 5,111,718 | 5/1992 | Iizuka | 477/158 |
| 5,113,719 | 5/1992 | Suzuki et al. | 477/158 |
| 5,505,675 | 4/1996 | Kuriyama et al. | 477/158 |

*Primary Examiner*—Dirk Wright
*Attorney, Agent, or Firm*—Sixbey, Friedman, Leedom & Ferguson,PC; Gerald J. Ferguson, Jr.; Donald R. Studebaker

[57] ABSTRACT

A control system for an automatic transmission of an engine equipped with a traction control which causes a drop in engine output by retarding ignition timing regulates line pressure of the hydraulic control circuit on the basis of engine output torque determined according to an advance angle of ignition timing when the traction control is not executed or on the basis of engine output torque, which is lower than that before execution of the traction control and higher than that after execution of the traction control, estimated on the basis of a basic advance angle of ignition timing when traction control is executed.

16 Claims, 13 Drawing Sheets

20

CONTROL SYSTEM FOR AUTOMATIC TRANSMISSION

BACKGROUND OF THE INVENTION

1. Field of the Invention

This invention relates to a control system for an automotive automatic transmission applied to an engine of the type equipped with torque down control such as traction control.

2. Description of Related Art

Automotive automatic transmissions make use of torque converters to transfer engine output torque to a transmission gear mechanism. The transmission gear mechanism incorporates a plurality of friction coupling elements which are selectively locked and unlocked to change power transmission paths so as to shift the automatic transmission to desired gears according to vehicle driving conditions. This type of automatic transmission utilizes a hydraulic control circuit to generate hydraulic line pressure applied to activate the friction coupling elements.

If the line pressure generated in the hydraulic control circuit is lowered in relation to a specific input torque to a friction coupling element to be locked, the friction coupling element falls short of torque transfer capacity and, consequently, encounters slippage, resulting in being disabled for the reliable transmission of necessary torque. Conversely, if the line pressure is too high, an oil pump experiments an increase in driving loss which always leads to useless consumption of engine output.

In a conventional automatic transmission, by making use of the fact that torque input to the automatic transmission or the friction coupling elements of the automatic transmission is proportional to engine output torque, the line pressure is adjusted according to opening of the engine throttle valve which governs engine torque output so as to be adjust relatively to torque input to the friction coupling element. In this manner, the problems of excessive or insufficient line pressure is alleviated.

Another approach described in, for instance, Japanese Unexamined Patent Publication No.7-139619 is to adjust the line pressure according to output torque of an engine or input torque to an automatic transmission or the friction coupling elements of the automatic transmission with the effect of providing more precise line pressure control.

In recent years, traction control systems have been developed which are able to adjust driving force applied to driving wheels of the vehicle to prevent slippage (loss of traction against the road surface) of the driving wheels and thereby to improve driving performance of the vehicle through more efficient use of the driving force.

Such a traction control system utilizes speed sensors to detect speeds of respective wheels. When an occurrence of wheel slippage is detected on the basis of the wheel speeds, the traction control system executes control of reducing driving force transmitted to a slipping wheel in order to eliminate the wheel slippage. This reduction in driving force is attained by means of reducing engine output torque, or through application of brake to the slipping driving wheel while slippage is detected. The reduction in engine output torque is achieved through, for instance, retarding ignition timing or reducing the number of operating cylinders.

In cases where line pressure in the automatic transmission is adjusted relatively to engine output torque, as described in the Japanese Unexamined Patent Publication No. 7-139619, the line pressure is lowered relatively to a reduction in engine output caused through the traction control and, when the traction control terminates and engine output torque increases consequently, rises to a pressure level present before execution of the traction control. This line pressure recovery results in an occurrence of various shortcomings as will be explained presently.

When the traction control terminates, the engine output torque returns relatively quickly to its pre-traction control level in response to the discontinuance of ignition timing retardation control or the reduction control of the number of operating cylinders. There occurs, however, a problem in that the line pressure in the automatic transmission having lowered once takes more time to return to its pre-traction control level after the termination of the traction control. For this reason, the automatic transmission encounters, immediately after the termination of the traction control, a serious situation that there occurs a period during which the line pressure supplied to the friction coupling elements is insufficient relatively to output torque from the engine or input torque to the automatic transmission and undesirably allows the friction coupling elements to slip. This problem occurs immediately after termination of the control of dropping engine output torque during a gear shift.

SUMMARY OF THE INVENTION

It is an object of the invention to providing an automatic transmission control system which can eliminate a time delay in recovery of line pressure caused due to and after termination of the torque down control of an engine which is needed during execution of the traction control or gear shifts.

The above object of the invention is accomplished by providing a control system for controlling an automatic transmission which is provided with a plurality of friction coupling element selectively locked and unlocked to place the automatic transmission into desired gears and installed to an internal combustion engine of the type that the engine is control to cause a drop in output torque under specified vehicle driving conditions. The automatic transmission control system includes a hydraulic control circuit for selectively supplying hydraulic pressure to the friction coupling elements in which line pressure is controlled to return to its pre-traction control level after termination of the control of torque drop.

According to an embodiment of the invention, the automatic transmission control system is applied to an engine equipped with an output torque control function to cause a drop in engine output torque while the vehicle travels under specific driving conditions and has functions including a line pressure regulation function to regulate line pressure of the hydraulic control circuit according to engine output torque transmitted to the automatic transmission and a pressure drop restraint function to restrain a drop in the line pressure caused due to a drop in engine output torque during the torque drop control. The pressure drop may be restrained by fixing the line pressure at a specified level, for instance at a level lower than a level before execution of the torque drop control and, however, higher than a level to be developed according to a drop in the engine output torque during execution of the torque drop control. The pressure drop may further be restrained by gradually increasing the line pressure dropped according to a drop in the engine output torque during execution of the output torque control.

According to another embodiment of the invention, the automatic transmission control system is applied to an engine equipped an engine output control function according to engine control parameters differently determined according to vehicle driving conditions and has functions including a control parameter determination function to determine an engine control parameter, such as ignition timing, according to vehicle driving conditions and to make correction of the engine control parameter when specific vehicle driving conditions which necessitate a drop in output torque of the engine are monitored, and a pressure regulation function to regulate line pressure of a hydraulic control circuit according to output torque of the engine determined based on the engine control parameter. In this instance, the specific vehicle driving condition may be monitored in the form of an occurrence of slippage of the driving wheels which can be detected on the basis of speeds of the driving wheels.

According to another embodiment of the invention, the automatic transmission control system is applied to an engine equipped with a torque drop control function and has functions including a first control parameter determining function to determining a first control parameter, such as engine throttle opening, which is less effected by a drop in output torque of the engine, according to vehicle driving conditions, and a second control parameter which is easily effected by a drop in output torque of the engine and is apt to change more than the first control parameter between before and after an occurrence of the drop in output torque of the engine, and a pressure regulation function to regulate line pressure of a hydraulic control circuit based on the first control parameter when the specific vehicle driving conditions are monitored or based on the second control parameter when vehicle driving conditions other than the specific vehicle driving conditions are monitored.

According to still another embodiment of the invention, the automatic transmission control system is applied to an engine equipped with an engine output control feature and has functions including an engine control parameter determination function to determine an engine control parameter according to vehicle driving conditions and to make a correction of the engine control parameter when specific vehicle driving conditions which demand a drop in output torque of the engine are monitored, and a pressure regulation function to regulate line pressure of a hydraulic control circuit according to output torque of the engine determined based on the engine control parameter before the correction when vehicle driving conditions other than the specific vehicle driving conditions are monitored, or according to output torque of the engine determined based on the engine control parameter immediately before the specific vehicle driving conditions are monitored.

With the automatic transmission control system, during the torque drop control which is executed while slippage of driving wheels occurs or during a gear shift, the line pressure in the automatic transmission drops following a drop in the engine output torque through the execution of the torque drop control. As a result of controlling this drop in the line pressure through the operation of pressure drop restraint means, the line pressure quickly returns to the pre-torque drop control level following recovery of the engine output torque, and hence input torque to the automatic transmission, to the pre-torque drop control level at termination of the torque drop control. Resultingly, the problem that the friction coupling element encounters a shortage of line pressure in relation to the input torque due to a time delay in line pressure recovery directly after the torque drop control has terminated is eliminated. The time delay in line pressure recovery directly after the torque drop control has terminated is more certainly eliminated by fixing the line pressure held, in particular, at a level lower than line pressure before the execution of the torque drop control and, however, higher than line pressure dropped correspondingly to a drop in the input torque to the transmission as a result of the execution of the torque drop control. Accordingly, while the line pressure is lowered with the effect of reducing driving losses that an oil pump encounters during the execution of the torque drop control, the time delay in recovery of the line pressure is eliminated immediately after termination of the torque drop control. The gradual increase in the line pressure having once dropped ensures a reduction in driving losses of the oil pump and effectively eliminates the time delay in recovery of the line pressure immediately after termination of the torque drop control.

In the case where the automatic transmission control system determines the engine control parameter, based on which output torque of the engine is controlled, according to vehicle driving conditions and makes a correction of the engine control parameter when specific vehicle driving conditions which necessitate a drop in output torque of the engine are monitored, the line pressure of the hydraulic control circuit is regulated according to output torque of the engine determined based on the engine control parameter before the correction regardless of vehicle driving conditions. As a result, the line pressure is prevented from being dropped according to a drop in the engine output torque resulting from controlling output torque of the engine with the engine control parameter after the correction, and the time delay in recovery of the line pressure immediately after termination of the torque drop control is eliminated consequently.

In the case where the automatic transmission control system monitors a first control parameter such as engine throttle opening which is less effected by a drop in output torque of the engine and a second control parameter which is easily effected by a drop in output torque of the engine and is apt to change more than the first control parameter between before and after an occurrence of the drop in output torque of the engine, the line pressure of a hydraulic control circuit is regulated based on the first control parameter while the specific vehicle driving condition is monitored or based on the second control parameter while a vehicle driving condition other than the specific vehicle driving conditions is monitored. That is, during execution of the torque drop control, the line pressure is regulated based on the first control parameter which is less effected by a drop in output torque of the engine, so that a drop in the line pressure is suppressed, and the time delay in recovery of the line pressure, which is normally encountered immediately after termination of the torque drop control, is eliminated consequently.

Further, in the case where the automatic transmission control system makes a correction of an engine control parameter determined according to vehicle driving conditions when specific vehicle driving conditions which necessitate a drop in output torque of the engine are monitored, and the output torque of the engine is controlled based on the engine control parameter after the correction while monitoring a specific vehicle driving condition or based on the engine control parameter before the correction while monitoring a vehicle driving condition other than the specific vehicle driving conditions, the line pressure is regulated according to output torque of the engine determined based on the engine control parameter before the correction while the automatic transmission control system monitors a vehicle driving condition other than the specific vehicle driving conditions, or based on output torque of the engine determined based on the engine control parameter immediately before the automatic transmission control system monitors a specific vehicle driving condition, so that a drop in line pressure is suppressed, and the time delay in recovery of the line pressure, which is normally encountered immediately after termination of the torque drop control, is eliminated consequently.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE SPECIFIC EMBODIMENTS

Because internal combustion engines and automatic transmissions in cooperation with the engine are well known, the present description will be directed in particular to elements forming part of, or cooperating directly with, the control system in accordance with the present invention. It is to be understood that elements not specifically shown or described can take various forms well known to those skilled in the automobile art.

Figure 1:
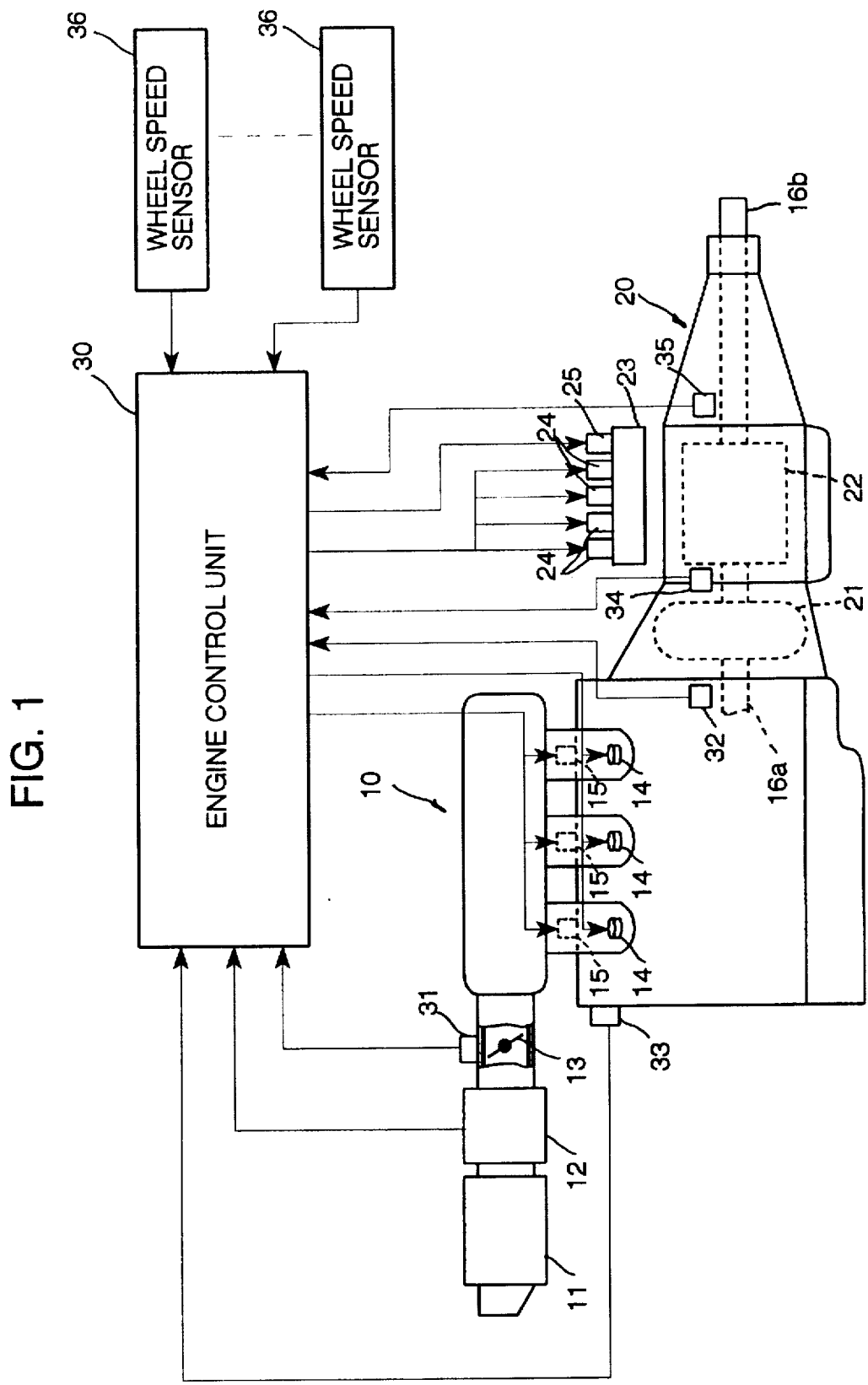
FIG. 1 is a schematic illustration of the automatic transmission control system of the invention.

Referring to the drawings in detail, in particular, to FIG. 1, an engine 10 is equipped with an intake pipe 11 having an air flow sensor 12 and a throttle valve 13 in order from an upstream end. The engine has fuel injectors 14 and spark plugs 15 which are individually equipped to respective cylinders. An automatic transmission 20, attached to engine 10, comprises a torque converter 21 connected to an output shaft 16a of the engine 10 and a transmission gear mechanism 22 to which the engine output torque is supplied through the torque converter 21. Possible gear ratios of the transmission gear mechanism 22 is established through selective application of line pressure to a plurality of friction coupling elements (not shown) through selective switching of pressure lines in a hydraulic control circuit 23.

Control unit 30 provides various control for the engine 10 and automatic transmission 20. The control unit 30 receives various signals including those output by the air flow sensor 12, a throttle valve sensor 31 which monitors the opening of the throttle valve 13, an engine speed sensor 32 which monitors the rotational speed of the engine output shaft 16a, and a temperature sensor 33 which monitors the temperature of engine cooling water. The control unit 30 further receives signals including those output by a speed sensor 34 which monitors the rotational speed of the turbine of the torque converter 21, a speed sensor 35 which monitors a vehicle speed through the rotational speed of an output shaft 16b of the transmission gear mechanism 22, and speed sensors 36 individually equipped to respective wheels which monitor wheel speeds of the wheels. All of these sensors 12 and 31 to 35 are known in various forms in the art and may take any well known types.

Control unit 30, in addition to providing injection control of the fuel injectors 14 and ignition timing control of the spark plugs 15, executes traction control in which the driving force supplied to driving wheels is controlled on the basis of signals from the wheel speed sensors 36.

When one of the wheel speed sensors 36 detects a falloff in wheel traction (slippage), the traction control activates to lower the output torque of the engine 10 by retarding the spark timing at the spark plugs 15. This control reduces the torque supplied to the driving wheels and eliminates the traction slippage condition. This type of engine output torque reduction in the traction control may be caused by stopping the supply of fuel to a designated cylinder or cylinders which will have the effect of reducing the number of operating cylinders, or by a combination of retarding ignition timing and reducing the number of operating cylinders, other than by retarding ignition timing. In these cases, in an attempt to more effectively reduce the driving force transmitted to the driving wheels, while reducing the engine output torque, control of braking force applied to the drive wheels may be performed.

Control unit 30 provides various transmission control, such as gear shift control of the automatic transmission 20 executed through operation of selected solenoids 24 installed to the hydraulic control circuit 23, lockup control for the torque converter 21, and line pressure control executed through operation of a duty solenoid 25 installed to the hydraulic control circuit 23. In this instance, the line pressure control is executed basically to develop line pressure according to engine output torque.

The following discussion concerns the operation of a part of the hydraulic control circuit 23 which is essential to the automatic transmission control system of this invention.

Figure 2:
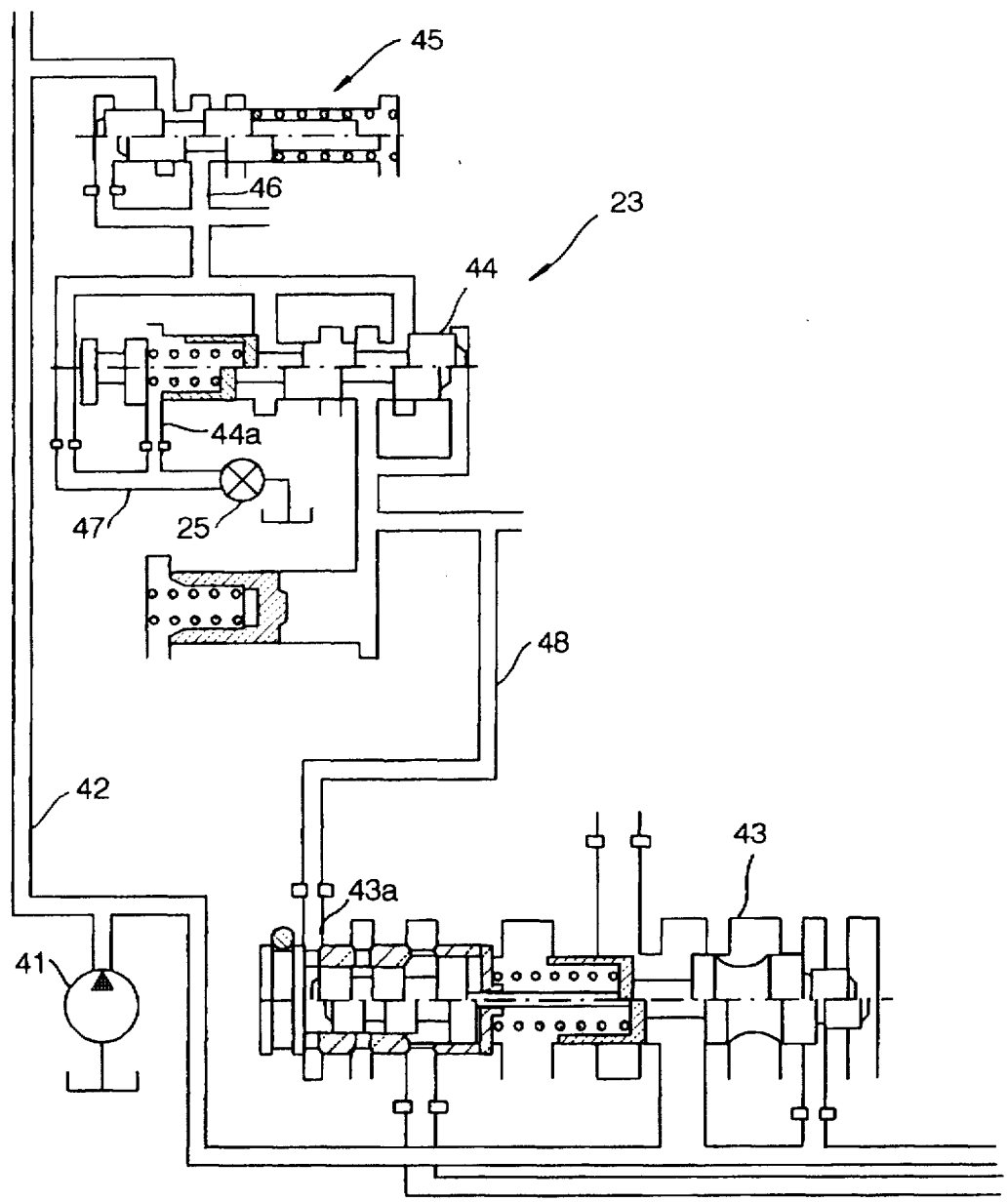
FIG. 2 is an essential part of a hydraulic control circuit used in the automatic transmission control system of FIG. 5.

As shown in FIG. 2, the hydraulic control circuit 23 is equipped, as necessary elements for the line pressure control, with a regulator valve 43 to adjust the operating pressure of a working oil supplied by an oil pump 41 through main line 42 at a specified level, a throttle modulator valve 44 to supply control pressure to the regulator valve 43, and a reducing valve 45 to supply a specified level of pressure necessary for the reducing valve to develop the control pressure.

Throttle modulator valve 44 is supplied with the specific level of pressure as a control source pressure from the reducing valve 45 through a pressure line 46, and is also supplied at its control port 44a with pilot pressure through a pressure line 47 which branches off from the pressure line 46 and in which the duty solenoid 25 shown in FIG. 2 is installed. The pilot pressure supplied to the throttle modulator valve 44 at the control port 44a determines a duty rate of the solenoid 25 (which is a proportion of an ON time during one ON-OFF duty cycle of the solenoid 25), and causes the throttle modulator valve 44 to adjust the source control pressure supplied by the reducing valve 45 to as the control pressure according to the duty rate. This control pressure is supplied to an intensifying port 43a of the regulator valve 43 through a pressure line 48 to adjust the line pressure according to the duty rate at which the duty solenoid 25 operates.

Figure 3:
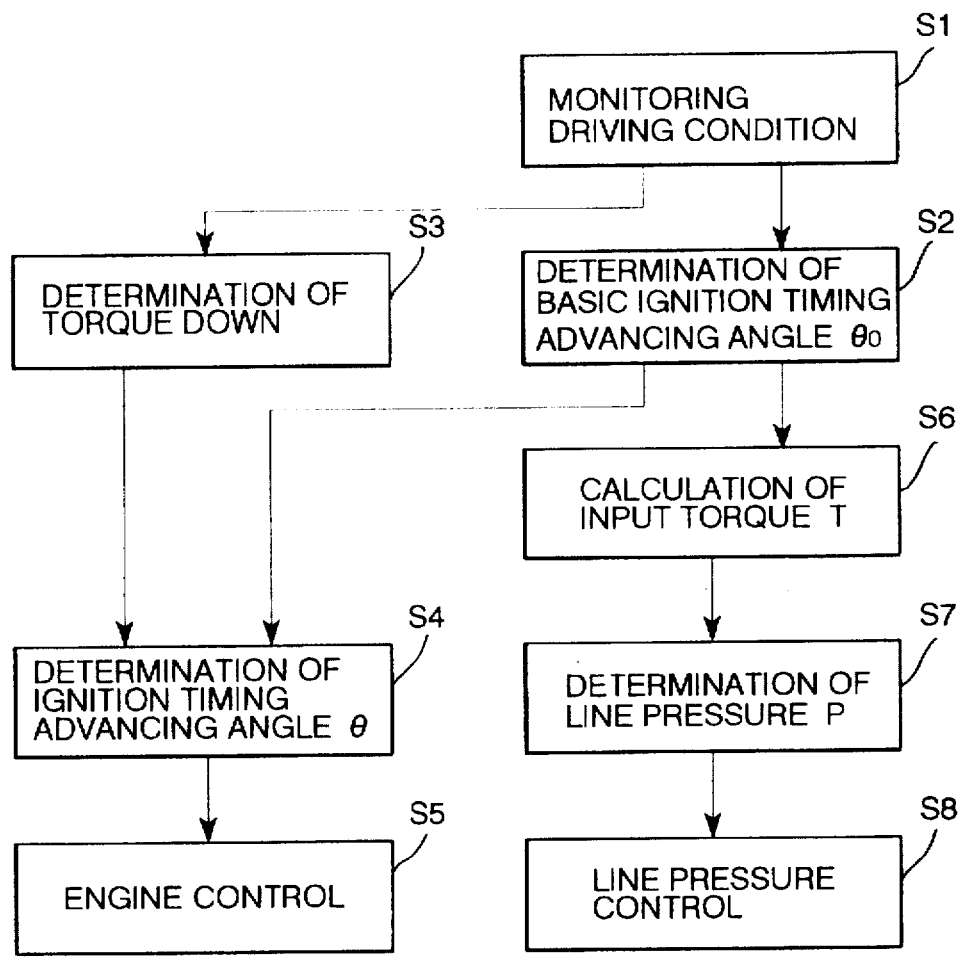
FIG. 3 is a block diagram illustrating the line pressure control executed in the automatic transmission control system.

The line pressure control executed by the control unit 30 will be hereafter described with reference to FIG. 3.

Figure 4:
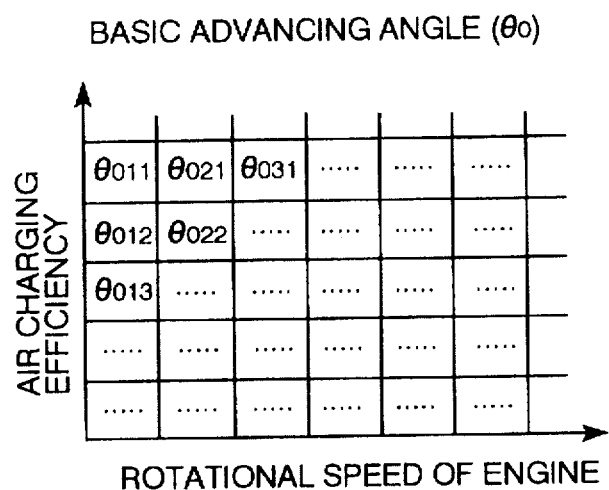
FIG. 4 is a map of basic advance angle of ignition timing in relation to engine speed and air charging efficiency.

Following detecting a vehicle driving condition of the vehicle on the basis of signals from the various sensors 12 and 31 to 36 at step S1, a basic advance angle of ignition timing θo is determined according to the vehicle driving condition at step S2. As shown in FIG. 4, this basic advance angle of ignition timing θo is read from a map of basic advance angle of ignition timing in which the utilization is made of engine speed and air charging efficiency as parameters. Simultaneously, the amount of engine output torque to be dropped (which is hereafter referred to engine torque drop) is determined at step S3. The amount of torque drop is determined to be 0 (zero) while the traction control is not executed or is determined according to slippage of the driving wheels detected on the basis of wheel speeds which are detected by the speed sensors 36 while the traction control is executed. At step S4, a practical advance angle of ignition timing θ is determined. This practical ignition timing advance angle θ is obtained by adding a correctional angle Δθ according to the temperature of engine cooling water to and subtracting a correctional angle according to the amount of engine torque drop from the basic ignition timing advance angle θo. At step S5, the engine 10 is controlled to make ignition at the practical ignition timing advance angle θ.

Figure 5:
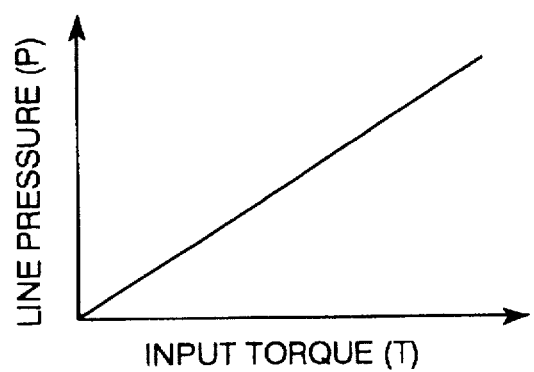
FIG. 5 is a map of line pressure in relation to input torque to an automatic transmission.

While determining the practical ignition timing advance angle θ, input torque T to the transmission gear mechanism 22 of the automatic transmission 20, which is equivalent to output torque from the engine 10, is calculated on the basis of the basic ignition timing advance angle θo at step S6 and a level of line pressure P relative to the input torque T is read as a target level from a line pressure map shown in FIG. 5 at step S7. At step S8, the duty solenoid 25 is controlled in operation to cause the throttle modulator valve 44 to develop the level of line pressure P.

Figure 6:
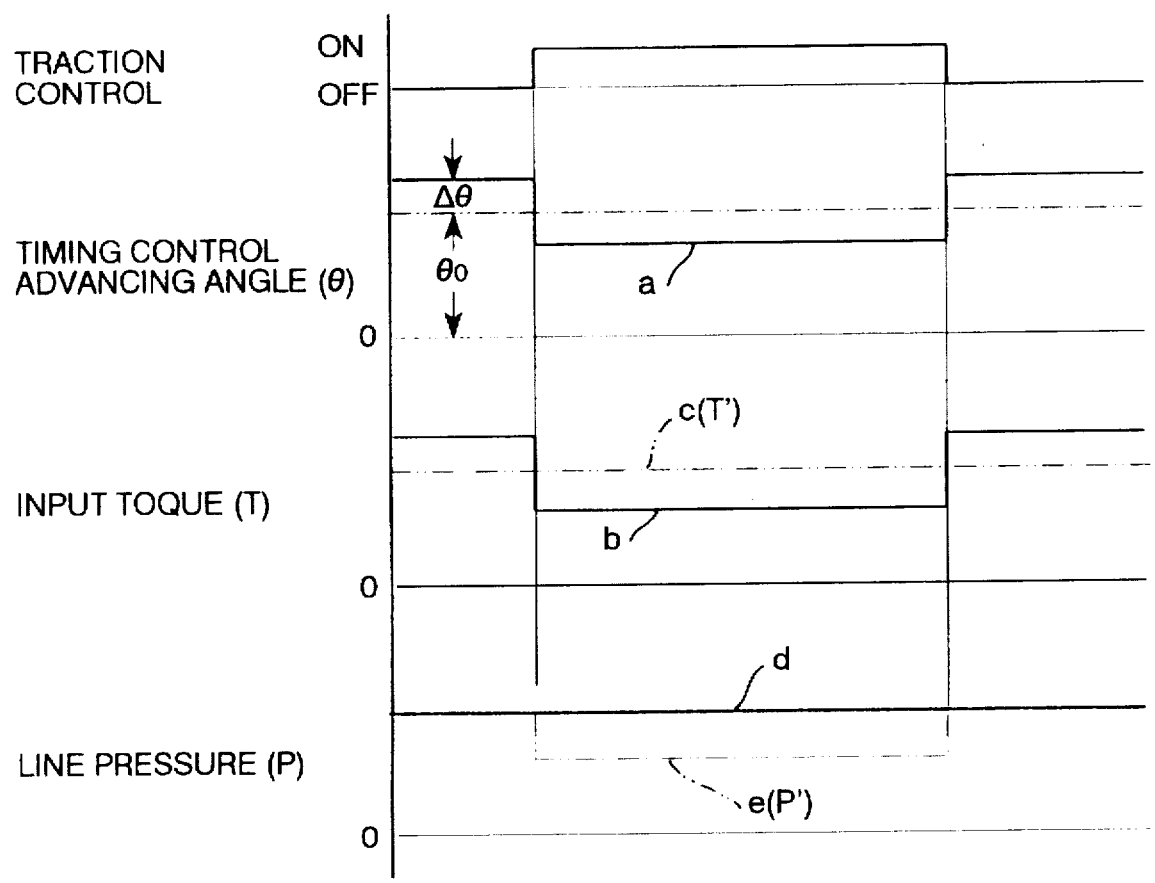
FIG. 6 is a time chart showing the line pressure control.

Resultingly, as shown in FIG. 6, when the traction control starts, the practical ignition timing advance angle θ (θo+Δθ) is reduced by a correctional angle Δθ as indicated by level line "a" with the result of a drop in input torque T as indicated by level line "b". On the other hand, because line pressure P is determined on the basis of the input torque T' indicated by level line "c" calculated from the basic ignition timing advance angle θo according to a present vehicle driving condition in spite of execution of the traction control, this line pressure P is maintained at a level "d" higher than a level "e" of line pressure P' which corresponds to the input torque T practically dropped. In other words, the line pressure is prevented to drop following a drop in engine output torque during execution of the traction control, steering clear of such a problem that, when the traction control terminates, while the input torque T quickly returns to its pre-traction control level, the line pressure P is delayed to return to the pre-traction control level.

Figure 7:
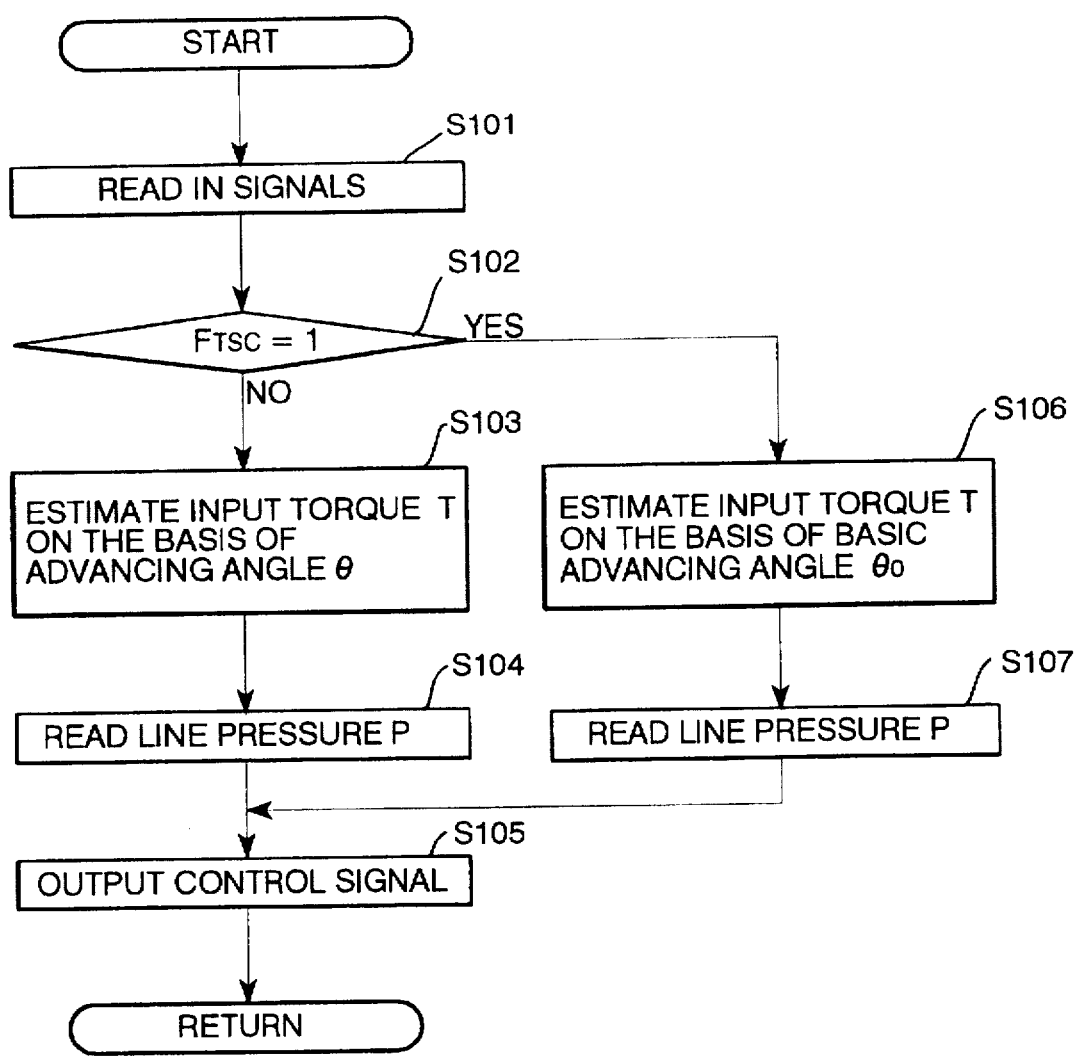
FIG. 7 is a flowchart illustrating the line pressure control sequential routine.

FIG. 7 shows a flowchart illustrating a variant of the line pressure control sequential routine executed by the control unit 30 in the automatic transmission control system of the invention.

The flowchart logic commences and control passes directly to a function block at step S101 where signals from the sensors 12 and 31 through 36 (see FIG. 1) are input to the control unit 30. Subsequently, a determination is made at step S102 as to whether a traction control flag FTRC is up or set to a state of "1" (one). In this instance, the traction control flag FTRC is Up or set to a state of "1" if the traction control is under execution to reduce the engine output torque in response to slippage of the drive wheels, or down or set to a state of "0" (zero) if the traction control is not under execution. In the event that the traction control flag FTRC is in the state of "0," i.e. when the traction control is not executed, then, at step S103, the control unit 30 estimates the input torque T to the transmission gear mechanism 20 on the basis of the ignition timing advance angle θ determined according to the present vehicle driving condition. In this case, the ignition timing advance angle θ is obtained by adding to a basic ignition timing advance angle θo read from the map of basic ignition timing advance angle shown in FIG. 4 a correctional angle Δθ according to the temperature of engine cooling water.

Thereafter, at step S104, a level of line pressure P relative to the input torque T is read as a target level from the line pressure map shown in FIG. 5. At step S105, a control signal is output to the duty solenoid 25 in order to develop the level of line pressure P in the hydraulic control circuit 23.

In the event where the traction control flag FTRC has been set to the state of "1" at step S102, thus signifying that the traction control is under execution, at step S106, the control unit 30 estimates input torque T' to the transmission gear mechanism 20 on the basis of the basic ignition timing advance angle θo determined according to the present vehicle driving condition.

Figure 8:
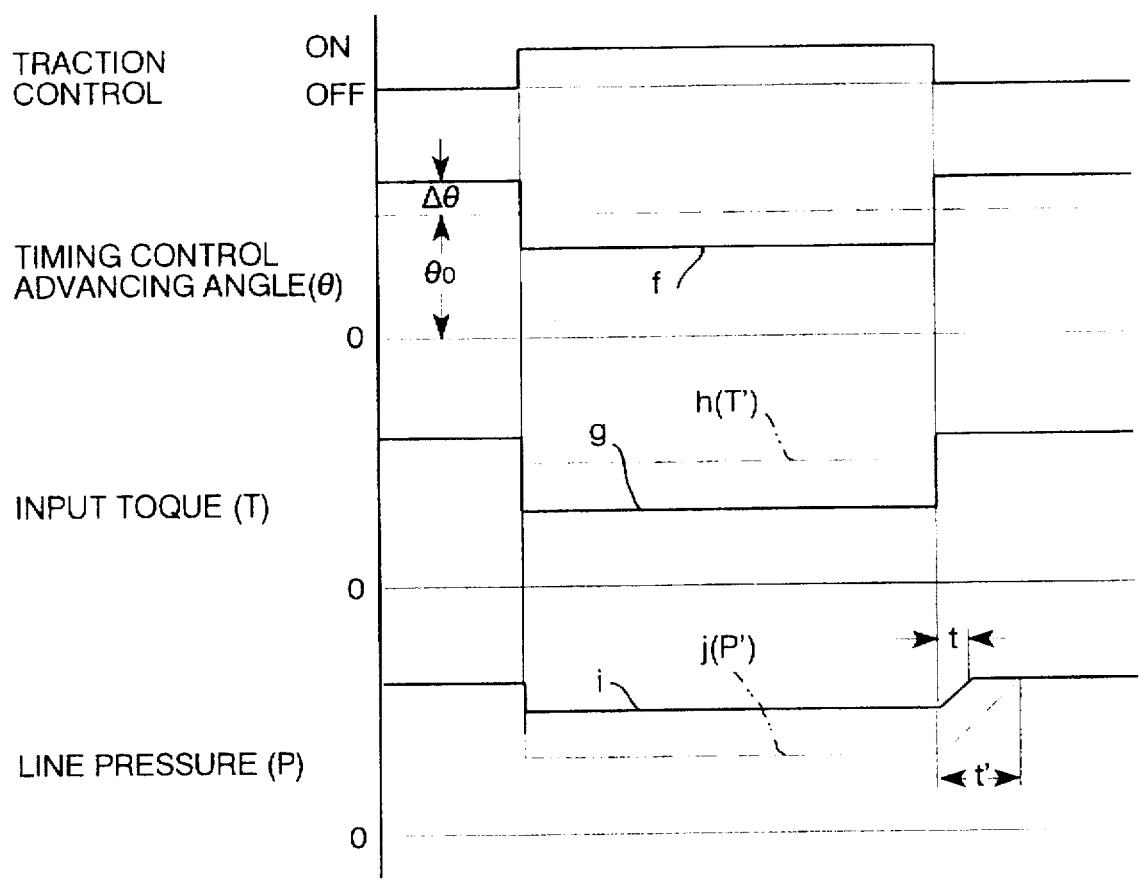
FIG. 8 is a time chart showing the line pressure control of FIG. 7.

As indicated by level line "f" in FIG. 8, the ignition timing advance angle θ is retarded by a correctional angle Δθ following initiation of the traction control with the effect of a drop in the input torque T as indicated by level line "g". Because the estimation of input torque T in this event is, however, made on the basis of the ignition timing advance angle θ without being varied by a correctional angle Δθ, i.e. on the basis of the basic ignition timing advance angle θo, input torque T' indicated by level line label "h" is estimated to be higher than the actually dropped input torque T indicated by level line "g," and lower than input torque indicated by level line "h" before execution of the traction control.

At step S107, a level of line pressure P is read as a target level from the line pressure map shown in FIG. 5 according to the estimated input torque T', which is, as shown by level line "i", higher than the level of line pressure P' indicated by level line "j" established in relation to the actually dropped input torque T, and lower than the level of line pressure before execution of the traction control. At step S105, a control signal is output to the duty solenoid 25 in order to develop the level of line pressure P in the hydraulic control circuit 23.

With the line pressure control, the drop in line pressure following a drop in engine output torque can be controlled during execution of the traction control, and consequently, the level of line pressure P during execution of the traction control remains higher than the level of line pressure P' corresponding to the actual input torque T. Resultingly, the delay in line pressure level recovery time may still occur with respect to the quick recovery of the input torque T after the traction control terminates and is, however, significantly shortened as indicated by a time "t" shorter than the conventional line pressure recovery time "t'". Together, the amount of a shortage of the line pressure P during the delay of recovery time is reduced.

Figure 9:
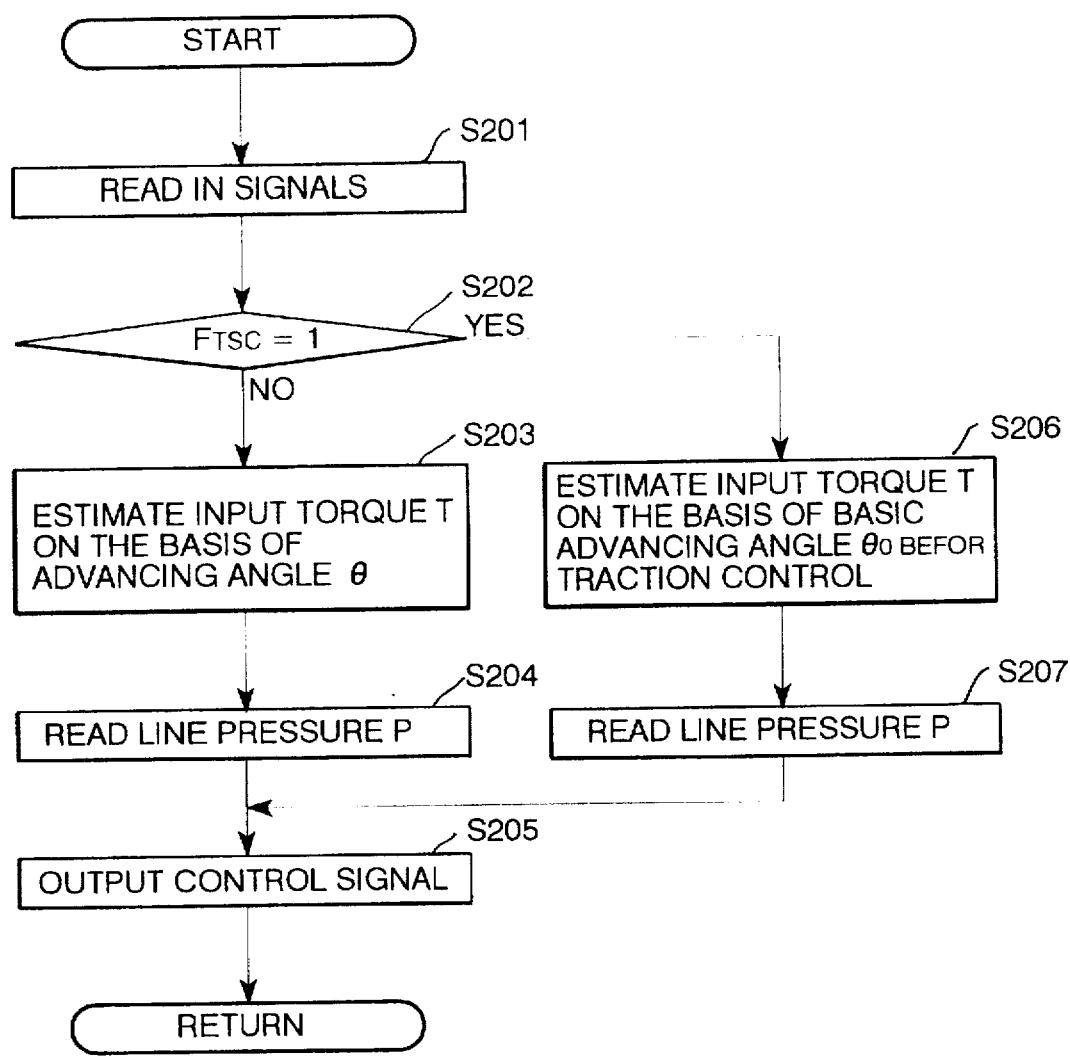
FIG. 9 is a flowchart illustrating a variant of the line pressure control sequential routine.

FIG. 9 shows a flowchart illustrating another variant of the line pressure control sequential routine executed by the control unit 30 in the automatic transmission control system of the invention which is basically similar to the line pressure control sequential routine previously described.

After reading in various signals at step S201, a determination concerning the traction control flag FTRC is made at step S202. When the traction control flag FTRC has been set to the state of "0" indicating that the traction control is not under execution, then, at step S203, the control unit 30 estimates input torque T to the transmission gear mechanism 20 on the basis of an ignition timing advance angle θ determined according to the present vehicle driving condition. In this case, the ignition timing advance angle θ is obtained by adding to a basic ignition timing advance angle θo, which is read from the map of basic ignition timing advance angle relative to engine speed and air charging efficiency shown in FIG. 4, a correctional angle Δθ determined according to the temperature of engine cooling water. Subsequently, a level of line pressure P in relation to the input torque T is read as a target level from the line pressure map shown in FIG. 5 at step S204. On the other hand, if the traction control flag FTRC has been set to the state of "1", indicating that the traction control is under execution, then, at step S206, the control unit 30 estimates a level of input torque T' to the transmission gear mechanism 20 on the basis of a basic ignition timing advance angle θo stored before the execution of the traction control. Subsequently, a level of line pressure P is read as a target level in relation to the estimated level of input torque T at step S207. At step S205, a control signal is output to the duty solenoid 25 to cause the throttle modulator valve 44 to develop the target level of line pressure P obtained at step S204 or S207.

Figure 10:
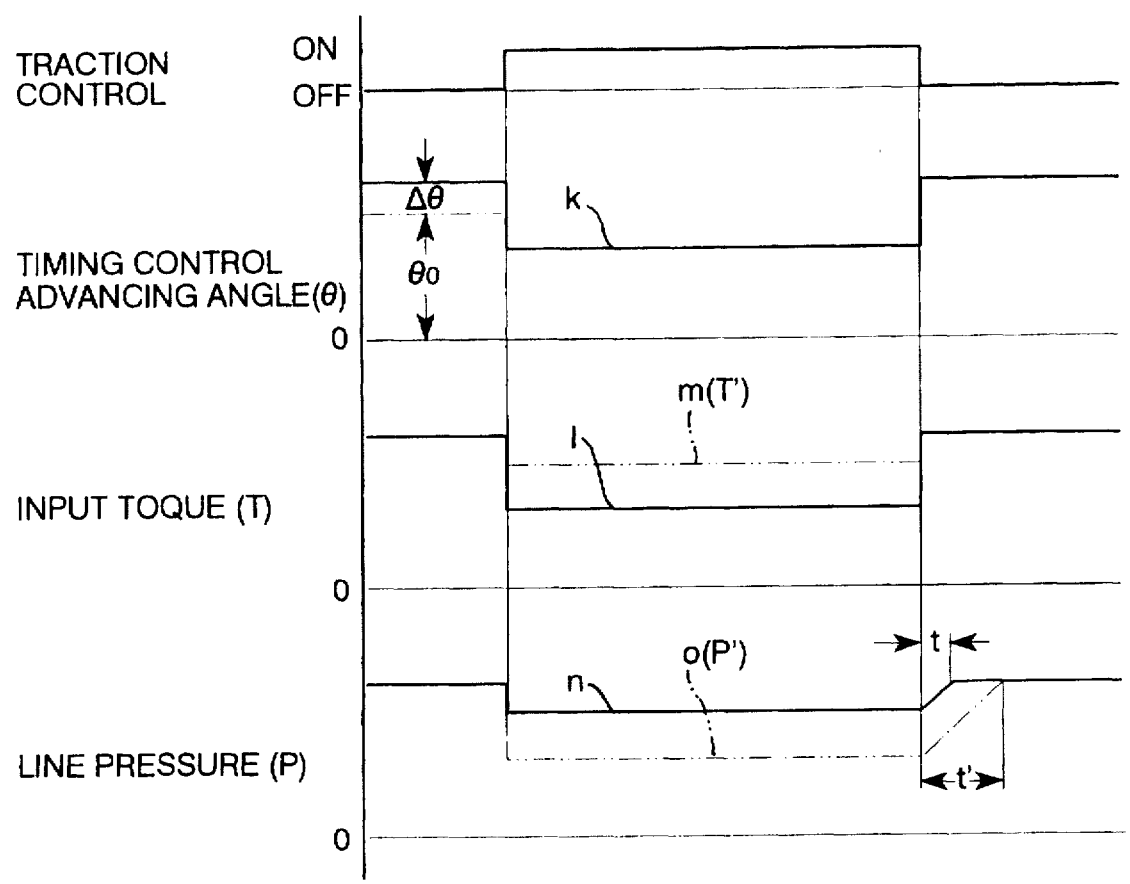
FIG. 10 is a time chart showing the line pressure control of FIG. 9.

As a result of this control routine, the line pressure P corresponding in level to the input torque T is obtained when the traction control is not under execution. Together, as shown in FIG. 10, when the traction control starts, the ignition timing advance angle θ (θo+Δθt) is reduced by a correctional angle as indicated by level line "k" with the result of a drop in input torque T as indicated by level line "I". On the other hand, after the traction control has started once, because the level of line pressure P is determined on the basis of the level of input torque T' calculated from the basic ignition timing advance angle θo before the execution of the traction control whose level is higher than a level of the actually dropped input torque T and, however, lower than a level before the execution of the traction control as indicated by level line "m,"resulting in a level indicated by level line "n" higher than a level of line pressure P'0 indicated by level line "o" and, however, lower than a level of line pressure before the execution of the traction control.

Resultingly, with the line pressure control routine, while the delay in line pressure level recovery time may still occur with respect to the quick recovery of the input torque T after the traction control terminates, nevertheless it is significantly shortened as indicated by a time "t" shorter than the conventional line pressure recovery time "t'". Together, the amount of a shortage of the line pressure P during the delay of recovery time is reduced.

Figure 11:
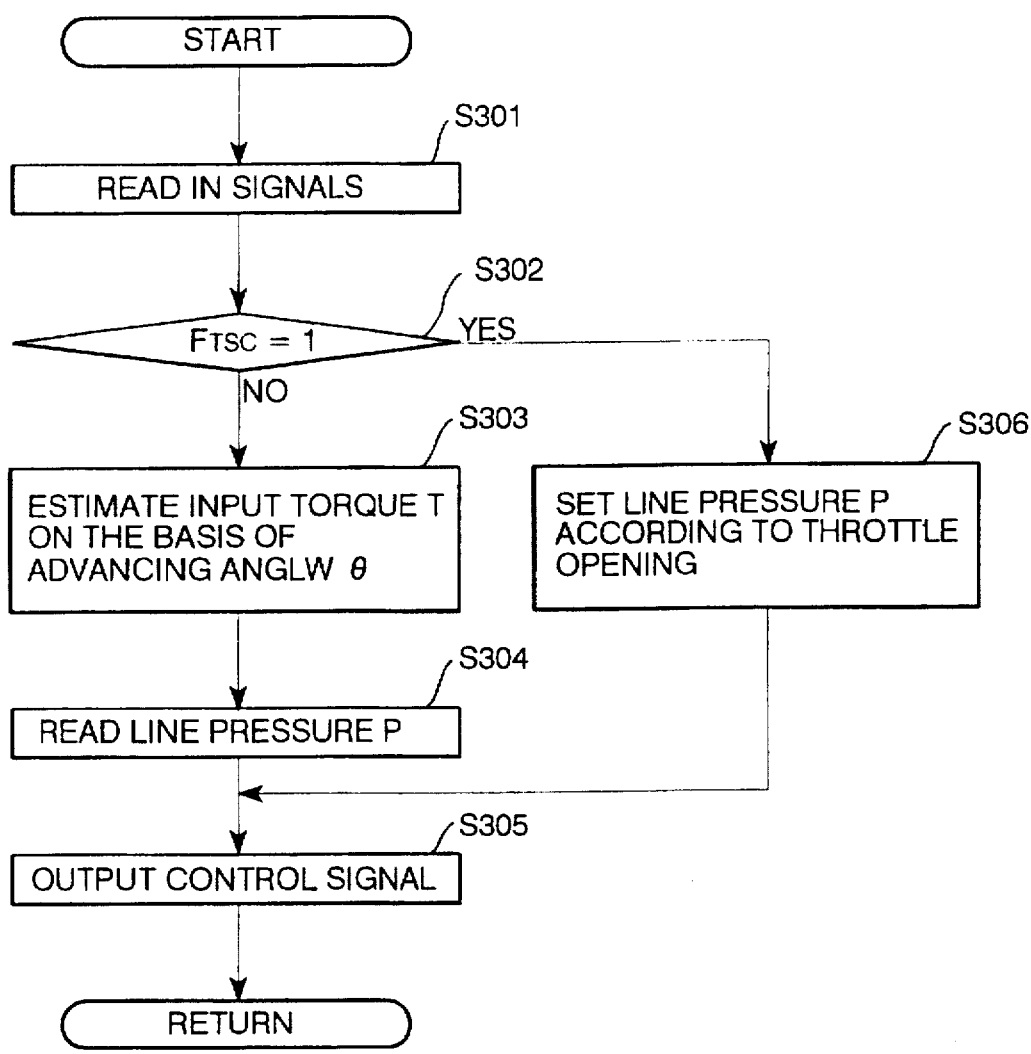
FIG. 11 is a flowchart illustrating another variant of the line pressure control sequential routine.

FIG. 11 shows a flowchart illustrating a line pressure control sequential routine executed by the control unit 30 in the automatic transmission control system of the invention which is a modification of that shown in FIG. 9 such that, if the traction control is under execution, a level of line pressure is determined according to opening of the throttle valve 13.

Specifically, after reading in various signals at step S301, a determination concerning the traction control flag FTRC is made at step S302. When the traction control flag FTRC has been set to the state of "0" indicating that the traction control is not under execution, then, at step S303, the control unit 30 estimates input torque T to the transmission gear mechanism 20 on the basis of an ignition timing advance angle θ determined according to the present vehicle driving condition. In this case, the ignition timing advance angle θ is obtained by adding to a basic ignition timing advance angle θo, which is read from the map of basic ignition timing advance angle relative to engine speed and air charging efficiency shown in FIG. 4, a correctional angle Δθ determined according to the temperature of engine cooling water. Subsequently, a level of line pressure P in relation to the input torque T is read as a target level from the line pressure map shown in FIG. 5 at step S304.

Figure 12:
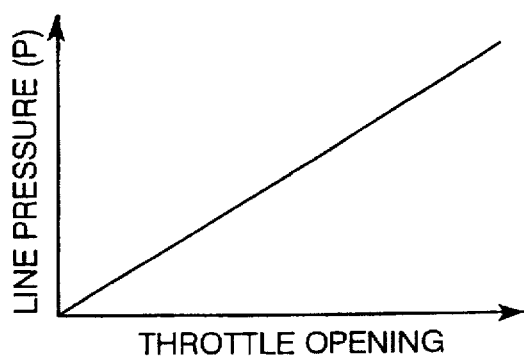
FIG. 12 is a map of line pressure in relation to opening of an engine throttle valve.

If the traction control flag FTRC has been set to the state of "1", indicating that the traction control is under execution, then, at step S306, the control unit 30 directly determines a target level of line pressure P on the basis of opening of the throttle valve 13 as a present vehicle driving condition. The relationship between throttle opening and line pressure is prepared as a map as shown in FIG. 12. At step S305, a control signal is output to the duty solenoid 25 to cause the throttle modulator valve 44 to develop the target level of line pressure P obtained at step S304 or S206.

While, if the level of line pressure P is determined on the basis of the level of input torque T during execution of the traction control, it will drop in level correspondingly to a drop in the input torque T caused due to the traction control, the line pressure control shown in FIG. 11 controls a drop in the level of line pressure P, providing a relatively high level of line pressure P. This is because the level of line pressure P is determined unconditionally based on throttle opening which remains at a relatively large value even during execution of the traction control.

With the line pressure control routine, while the delay in line pressure level recovery may still occur with respect to the quick recovery of the input torque T after the traction control terminates, nevertheless, the time delay is significantly shortened or eliminated.

Instead of determining the level of line pressure P on the basis of opening of the throttle valve 13 during execution of the traction control, it may also be determined on the basis of the amount of intake air introduced into the engine 10 or the negative pressure of intake are. In these case, a drop in line pressure level is also suppressed during execution of the traction control, and the delay time in line pressure recovery is shortened or eliminated.

Figure 13:
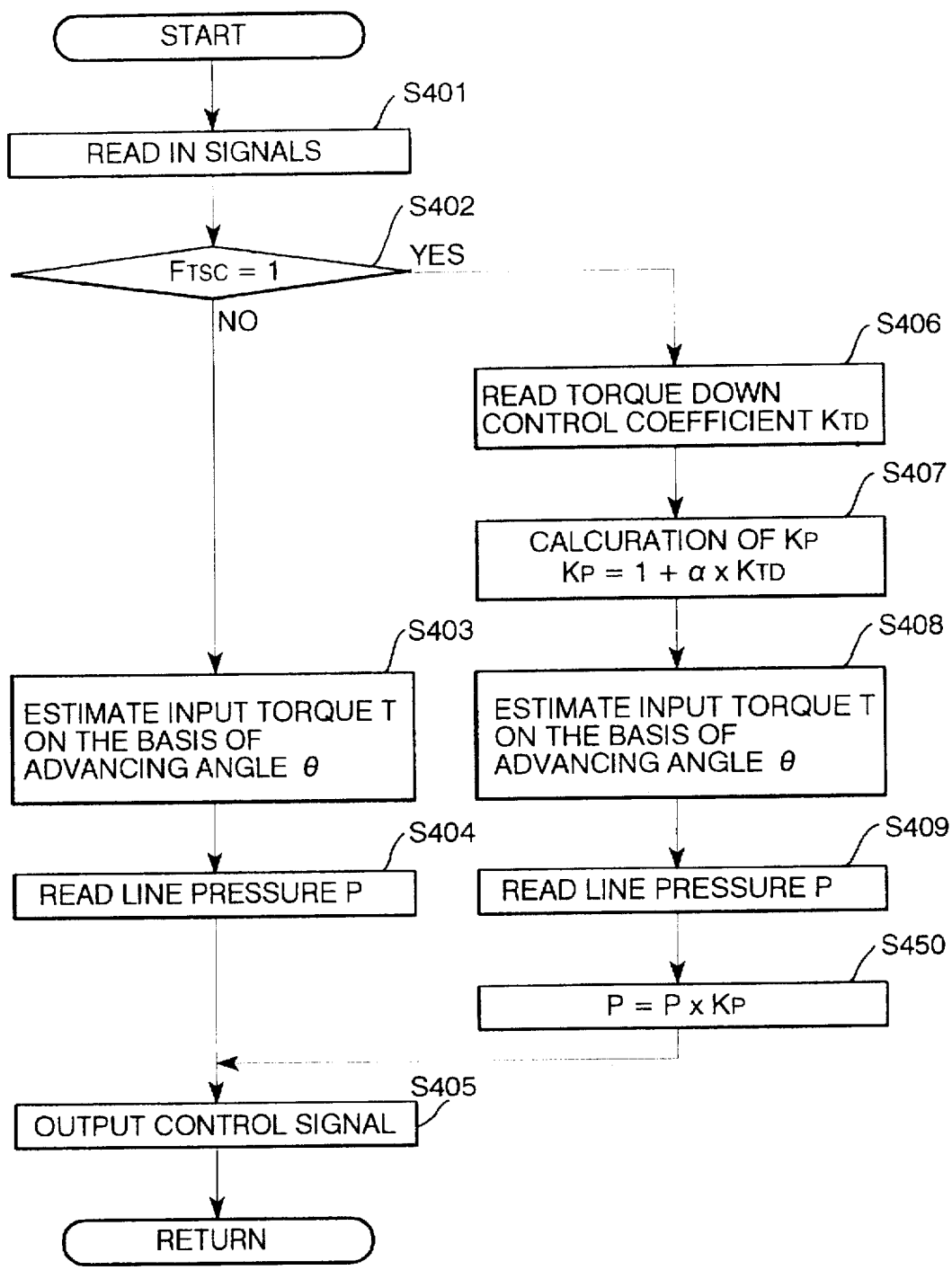
FIG. 13 is a flowchart illustrating another variant of the line pressure control sequential routine.

FIG. 13 shows a flowchart illustrating another variant of the line pressure control sequential routine executed by the control unit 30 in the automatic transmission control system of the invention. The flowchart logic commences and control passes directly to a function block at step S401 where signals from the various sensors 12 and 31 through 36 (see FIG. 1) are input to the control unit 30. Subsequently, a determination is made as to whether the traction control flag FTRC has been set to the state of "1~ at step S402. If the traction control flag RTRC has been set to the state of "0", input torque T is estimated on the basis of an ignition timing advance angle θ at step S403 in the same manner as was described previously, and, in relation to the estimated input torque T, a level of line pressure P is read as a target level from a map of input torque T shown in FIG. 5 step S404.

If the traction control flag FTRC has been set to the state of "1", a torque drop coefficient KTD is read out at step S406. This torque drop coefficient KTD, which is determined in the torque drop control separately executed, defines a level of engine output torque in percentage to which the engine output torque is dropped through the traction control. Subsequently, the torque down coefficient KTD is used to calculate a line pressure correctional coefficient KP from the formula (I) given as follows:

$$KP = 1 + \alpha \cdot KTD \quad (I)$$

In this formula, α is the constant and is established, for example, as 0.5.

At subsequent steps S408 and S409, in the same manner as executed at the previous steps S403 and S404 when the traction control is not executed, input torque T is estimated on the basis of an ignition timing advance angle θ according to a present vehicle driving condition, and a level of line pressure P in relation to the estimated input torque T is read from the line pressure map shown in FIG. 5. At step S410, a line pressure correctional coefficient KP is applied to obtain a target level of line pressure P to be developed during execution of the traction control.

For instance, the correctional line pressure coefficient KP is calculated as 1.25 from the formula (I) when the torque drop coefficient KTD is a 50 percent and the constant a is 0.5. In this case, the level of line pressure P, which relates to the level of input torque T, is controlled as a 50 percent of the level of line pressure before the execution of the traction control according to a drop in the input torque T. However, by applying the line pressure correctional coefficient KP of 1.25, the level of line pressure P becomes 62.5 percent of the level before the execution of traction control, and, as a result, the drop in the level of line pressure P due to a drop in the engine output torque is suppressed by 12.5 percent during the execution of the traction control.

At step S405, a control signal is output to the duty solenoid 25 to cause the throttle modulator valve 44 to develop the target level of line pressure P obtained at step S404 or S410 in the hydraulic control circuit 30.

As described above, the level of line pressure P is developed according to the input torque T during interruption of the traction control. Together, in the similar manner to those described in the previous variants, the time delay in line pressure recovery is significantly shortened or eliminated upon termination of the traction control.

Figure 14:
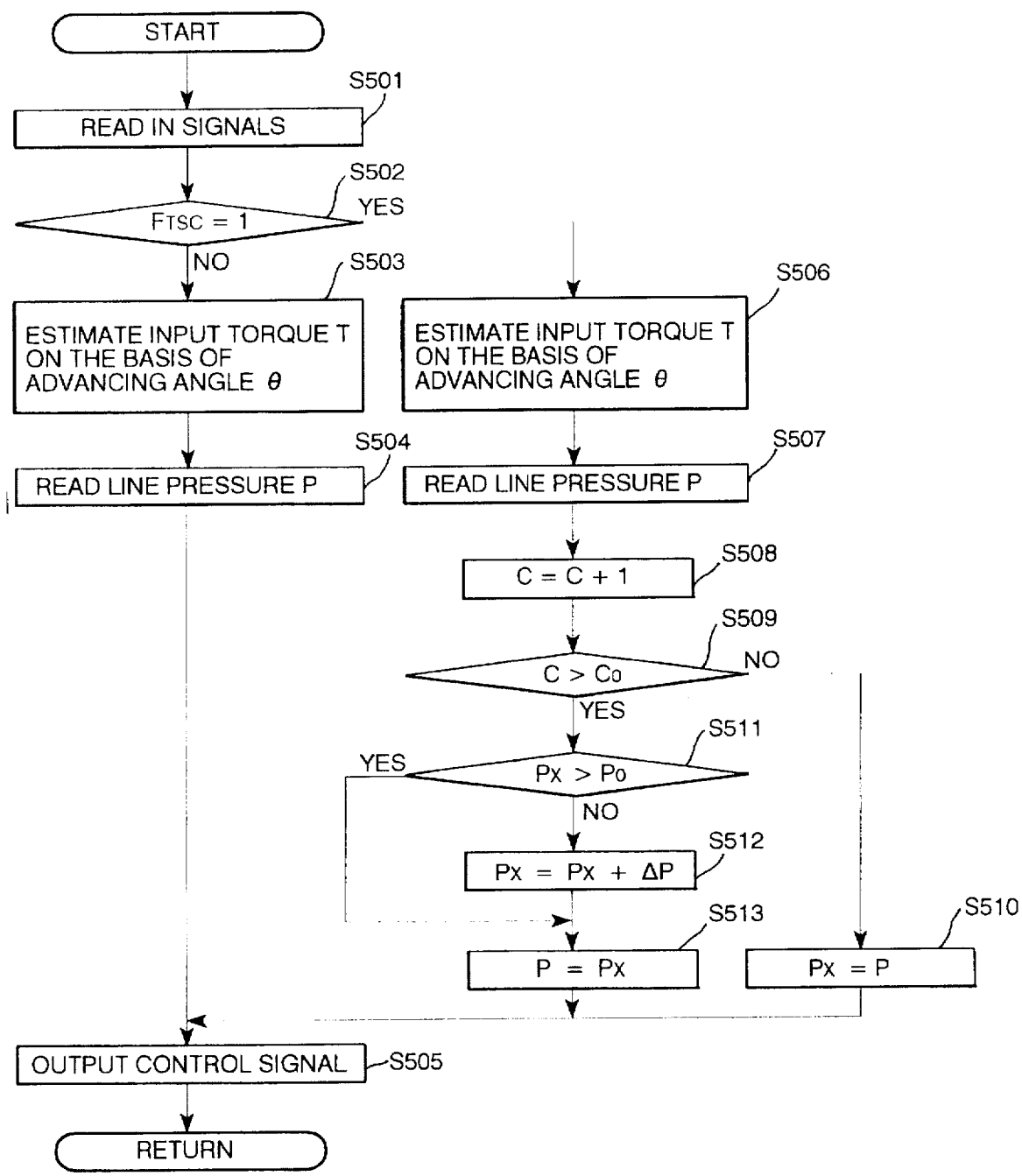
FIG. 14 is a flowchart illustrating still another variant of the line pressure control sequential routine.

FIG. 14 shows a flowchart illustrating another variant of the line pressure control sequential routine executed by the control unit 30 in the automatic transmission control system of the invention. Following to reading in signals at step S501, a determination is made as to whether the traction control flag FTRC has been set to the state of "1" at step S502. If the traction control flag RTRC has been set to the state of "0", the input torque T is estimated on the basis of an ignition timing advance angle θ at step S503 in the same manner as was described previously, and, in relation to the estimated input torque T, a level of line pressure P is read as a target level from a map of input torque T shown in FIG. 5 step S504.

If the traction control flag RTRC has been set to the state of "1", indicating that the traction control is under execution, then, in the same manner as described previously for steps S503 and S504, the levels of input torque T and line pressure P are subsequently obtained at step S506 and S507, respectively.

After adding to a count C of a time counter 1 (one) at step S508, a determination is made at step S509 as to whether the time counter has counted a specified count Co. If the count C is equal to or smaller than the specified count Co, that is, until a specified time interval to defined by the specified count Co has been surpassed after the initiation of the traction control, while the level of line pressure P is used as a target level of line pressure P, it is stored as an operational level of line pressure Px at step S510.

On the other hand, if the specified count Co is exceeded, that is, the specified time interval to has been over, then, a determination is made at step S511 as to weather the operational level of line pressure Px is greater than a specified level of line pressure Po. Until the operational level of line pressure Px has exceeded the specified level of line pressure Po, after the operational level of line pressure Px is altered by an increment ΔP at step S512, the altered operational level of line pressure Px is substituted for a target level of line pressure P at step S513. The alteration of the operating level of line pressure Px is repeated to gradually increase the target level of line pressure P at a fixed gradient from an initial level at the termination of the specified time interval to until the specified level of line pressure Po is exceeded. If the operational level of line pressure Px exceeds the specified level of line pressure Po, the operational level of line pressure Px is directly substituted for a target level of line pressure P without being updated at step S513.

At step S505, a control signal is output to the duty solenoid 25 to cause the throttle modulator valve 44 to develop the target level of line pressure P obtained at step S504, S510 or S513 in the hydraulic control circuit 30.

Figure 15:
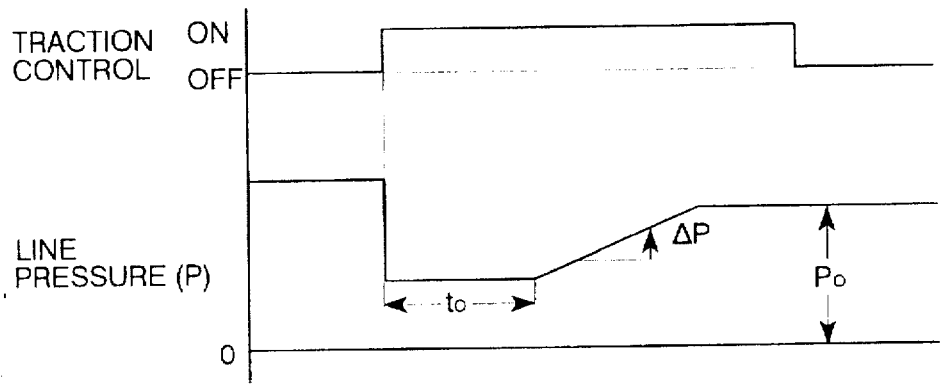
FIG. 15 is a time chart showing the line pressure control of FIG. 14.

As shown in FIG. 15, the level of line pressure P is gradually increased from the termination of the specified time interval to after once it has dropped in response to a drop in the input torque T at the initiation of the traction control and reaches the specified level of line pressure Po before the torque drop control terminates.

In this instance, the specified level of line pressure Po is established according to the basic ignition timing advance angle θo before execution of the traction control and, consequently, the line pressure P recovers its pre-traction control level at termination of the traction control. Resultingly, with the line pressure control routine, while the delay in line pressure level recovery time may still occur with respect to the quick recovery of the input torque T after the traction control terminates, nevertheless it is significantly shortened.

In place of retarding ignition timing to cause a drop in engine output torque during execution of the traction control, the number of operating cylinders may be reduced.

Figure 16:
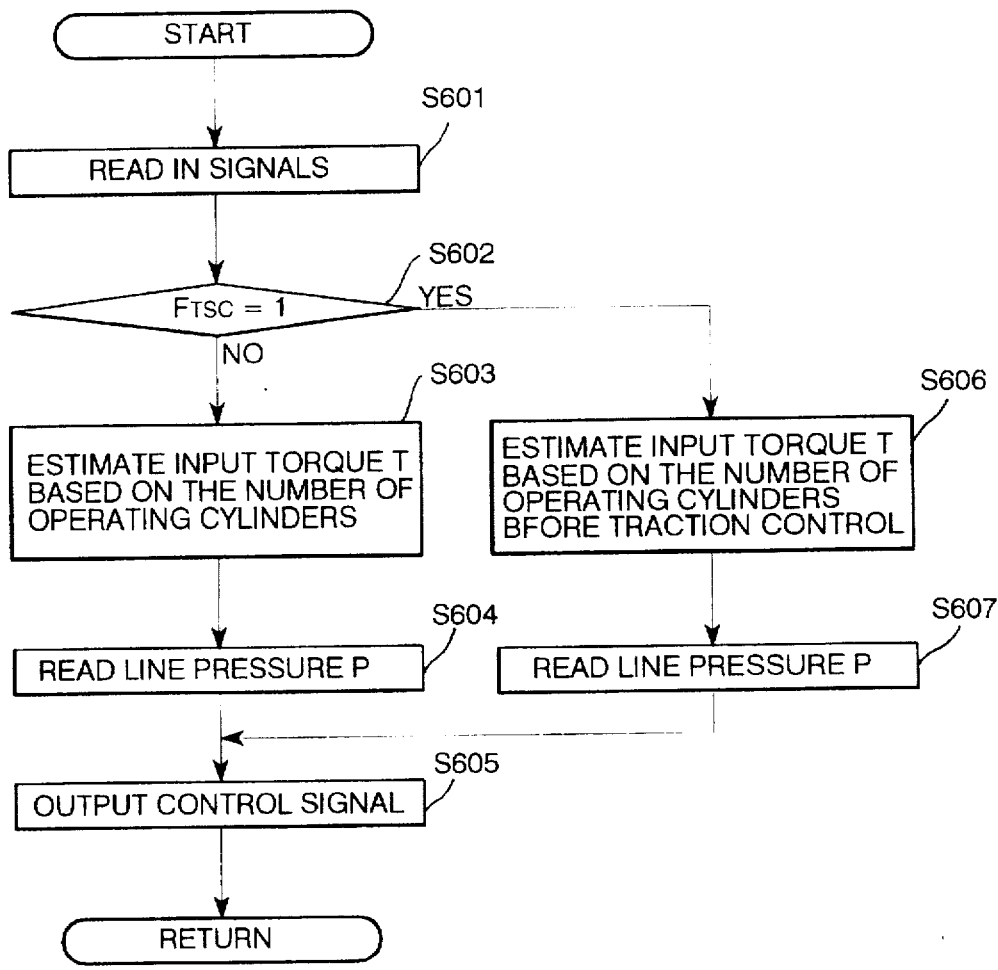
FIG. 16 is a flowchart illustrating a further variant of the line pressure control sequential routine.

FIG. 16 shows a flowchart illustrating traction control sequential routine in which the number of operating cylinders may be reduced in order to cause a drop in engine output torque during execution of the traction control. The flowchart logic commences and control directly passes to a function block at step S701 where signals are read in from the various sensors 12 and 31 through 36 (see FIG. 1). Subsequently, a determination concerning the traction control flag FTRC is made at step S702. If the traction control flag FTRC has been set to the state of "0", indicating that the traction control is not under execution, then, at step S703, the control unit 30 estimates input torque T to the transmission gear mechanism 20 on the basis of the number of cylinders operating at present. Subsequently, a level of line pressure P in relation to the input torque T is read as a target level from the line pressure map shown in FIG. 5 at step S704. On the other hand, if the traction control flag FTRC has been set to the state of "1", indicating that the traction control is under execution, then, at step S706, the control unit 30 estimates a level of input torque T to the transmission gear mechanism 20 on the basis of the number of cylinders having operated before the execution of the traction control. Subsequently, a level of line pressure P is read as a target level in relation to the estimated level of input torque T at step S707.

At step S705, a control signal is output to the duty solenoid 25 to cause the throttle modulator valve 44 to develop the target level of line pressure P obtained at step S704 or S707.

With the line pressure control routine, because, while the traction control causes a reduction in the number of operating cylinders with the effect of a drop in the output torque from the engine 10, and hence a drop in the input torque T to the transmission gear mechanism 22, the level of line pressure P is adjusted according to the number of cylinders having operated before execution oh the traction control, the line pressure P is held at an approximately same level before and after initiation of the traction control. Resultingly, while the delay in line pressure level recovery time may still occur with respect to the quick recovery of the input torque T after the traction control terminates, nevertheless it is significantly shortened.

With the control system for an automatic transmission according to an embodiment of the invention, which is able to adjust line pressure according to input torque thereto from an engine, a drop in the level of line pressure, which may occur following a drop in the engine output torque which is caused during the traction control executed to eliminate slippage of driving wheels or during a gear shift, is suppressed. This prevents an event where a shortage of line pressure P to be supplied to friction coupling elements with respect to the input torque immediately occurs immediately after termination of the torque drop control due to the delay of line pressure recovery time which is encountered at the termination of the traction control and, consequently, eliminates slippage of the friction coupling elements due to the shortage of line pressure P. The slippage of driving wheels is more effectively eliminated by suppressing the drop in line pressure so as to provide a fixed level of line pressure.

With the control system for an automatic transmission according to another embodiment of the invention, which is able to establish a fixed level of line pressure which is lower than that before the torque drop control and, however, higher than that determined according to the input torque to be dropped during the torque drop control, while the line pressure is controlled to be low in order to reduce driving losses of the oil pump, the delay in the line pressure recovery time immediately after termination of the traction control is effectively eliminated.

With the control system for an automatic transmission according to another embodiment of the invention in which the level of line pressure P is gradually increased after a drop thereof following a drop in the input torque T during the traction control, while the line pressure is controlled to be low in order to reduce driving losses of the oil pump during the torque drop control, the delay in the line pressure recovery time immediately after termination of the torque down control is effectively eliminated.

With the control system for an automatic transmission according to another embodiment of the invention, in the event where, when the vehicle is under vehicle driving conditions which necessitate engine torque drops, first and second engine control parameters, the first one of which is determined according to the vehicle driving condition and corrected, are selectively used to control the engine, the line pressure is adjusted according to the level of engine output torque which is always determined on the basis of the first engine control parameter. This control results in preventing a drop in the line pressure due to a drop in the engine output torque in the case where the torque drop control is executed to prevent slippage as a loss of traction against the road surface of the driving wheels and a drop in the engine output torque is caused by altering ignition timing as one of the engine control parameters and, consequently, in leading to elimination of the delay in the line pressure recovery time immediately after termination of the torque down control.

In the case where the torque drop control is executed according to vehicle driving conditions, and the detection is made of a first engine control parameter, such as opening of the engine throttle valve, which is relatively less effected by a drop in the engine output torque and relatively less changes between before and after execution of the torque drop control and a second engine control parameter which is relatively easily effected by a drop in the engine output torque and changes greatly between before and after execution of the torque drop control than the first engine control parameter, the line pressure is adjusted by making the utilization of the first engine control parameter during execution of the torque drop control and by making the utilization of the second engine control parameter during interruption of the torque drop control. This selective utilization of the first and second engine control parameter suppresses a drop in the line pressure corresponding to and in response to a drop in the engine output torque during the torque drop control, resulting in elimination of the delay in the line pressure recovery time immediately after termination of the torque down control.

In the event where, when the vehicle is under vehicle driving conditions which necessitate engine torque drops, the engine is controlled with the engine control parameter after correction, because the line pressure is adjusted according to the engine output torque determined on the basis of the engine control parameter immediately before the detection of a vehicle driving condition which necessitates an engine torque drop, a drop in the line pressure caused corresponding to and in response to a drop in the engine output torque during the torque drop control is suppressed, resulting in elimination of the delay in the line pressure recovery time immediately after termination of the torque down control.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A control system for controlling an automatic transmission having a plurality of friction coupling elements which are selectively locked and unlocked by means of a hydraulic control circuit to place the automatic transmission into desired gears, said automatic transmission being installed to an internal combustion engine equipped with engine torque control means for controlling the engine to cause a drop in output torque of the engine under specific vehicle driving conditions, said control system comprising:

driving condition monitor means for monitoring vehicle driving conditions;

control parameter monitor means for monitoring a first control parameter which is less effected by a drop in output torque of the engine caused by said engine torque control means and a second control parameter which is easily effected by a drop in output torque of the engine caused by said torque control means and is apt to change more than said first control parameter between before and after an occurrence of said drop in output torque of the engine; and pressure regulation means for regulating line pressure of the hydraulic control circuit based on said first control parameter when said driving condition monitoring means detects said specific vehicle driving conditions and based on said second control parameter when said driving conditions monitoring means detects vehicle driving conditions other than said specific vehicle driving conditions.

2. A control system for controlling an automatic transmission as defined in claim 1, wherein said control parameter monitor means monitors opening an engine throttle as said first control parameter.

3. A control system for controlling an automatic transmission having a plurality of friction coupling elements which are selectively locked and unlocked by means of a hydraulic control circuit to place the automatic transmission into desired gears, said automatic transmission being installed to an internal combustion engine equipped with engine control means for controlling output torque of the engine according to vehicle driving conditions, said control system comprising:

driving condition monitor means for monitoring vehicle driving conditions;

control parameter determination means for determining an engine control parameter according to vehicle driving conditions detected by said driving condition monitor means, and for making a correction of said engine control parameter when said driving condition monitor means detects specific vehicle driving conditions which necessitate a drop in output torque of the engine, said engine control means controlling output torque of the engine based on said engine control parameter after said correction under said specific vehicle driving conditions and based on said engine control parameter under vehicle driving conditions other than said specific vehicle driving conditions; and pressure regulation means for, while said driving condition monitor means detects said specific driving conditions, regulating line pressure of the hydraulic control circuit output torque of the engine determined based on said engine control parameter at a point of time immediately before said driving condition monitor means detects said specific driving conditions, and according to output torque of the engine determined based on said engine control parameter immediately before said driving condition monitor means monitors said specific vehicle driving condition.

4. A control system for controlling an automatic transmission having a plurality of friction coupling elements which are selectively locked and unlocked by means of a hydraulic control circuit to place the automatic transmission into desired gears, said automatic transmission being installed to an internal combustion engine equipped with engine control means for controlling output torque of the engine according to vehicle driving conditions, said control system comprising:

driving condition monitor means for monitoring vehicle driving conditions;

control parameter determination means for determining ignition timing of the engine as an engine control parameter, based on which the engine control means controls output torque of the engine, according to vehicle driving conditions detected by said driving condition monitor means, and for correcting said ignition timing when said driving condition monitor means detects specific vehicle driving conditions which necessitate a drop in output torque of the engine; and pressure regulation means for regulating line pressure of the hydraulic control circuit according to output torque of the engine determined based on said ignition timing, while said engine control means controls output torque of the engine based on said corrected ignition timing, during an occurrence of said specific vehicle driving conditions.

5. A control system as defined in claim 4, wherein said control driving condition monitor means comprises a speed sensor to monitor a wheel speed in rotation of each of driving wheels of the vehicle and detects an occurrence of slippage of said driving wheels as said specific driving condition based on said wheel speeds.

6. A control system as defined in claim 4, wherein said pressure regulation means fixes said line pressure at a specified level during execution of control of said engine output torque while said driving condition monitor means detects said specific vehicle driving conditions.

7. A control system as defined in claim 4, wherein said pressure regulation means fixes said line pressure at a level lower than a level at a point of time before execution of control of said engine output torque and higher than a level to be developed according to a drop in said engine output torque during execution of control of said engine output torque.

8. A control system as defined in claim 4, wherein said pressure regulation means gradually increases said line pressure dropped according to a drop in said engine output torque during execution of control of said engine output torque.

9. A control system for controlling an automatic transmission having a plurality of friction coupling elements which are selectively locked and unlocked by means of a hydraulic control circuit to place the automatic transmission into desired gears, said automatic transmission being installed to an internal combustion engine equipped with engine control means for controlling output torque of the engine according to vehicle driving conditions, said control system comprising:

speed monitor means for monitoring a wheel speed in rotation of each of driving wheels of the vehicle and detect an occurrence of slippage of said driving wheels based on said wheel speeds;

control parameter determination means for determining an engine control parameter, based on which the engine control means controls output torque of the engine, according to said wheel slippage detected by said speed monitor means, and for correcting said engine control parameter when said speed monitor means detects a specific wheel speed which necessitates a drop in output torque of the engine; and pressure regulation means for regulating line pressure of the hydraulic control circuit according to output torque of the engine determined based on said engine control parameter, while said engine control means controls output torque of the engine based on said corrected engine control parameter, during an occurrence of said specific wheel speed.

10. A control system for controlling an automatic transmission having a plurality of friction coupling elements which are selectively locked and unlocked by means of a hydraulic control circuit to place the automatic transmission into desired gears, said automatic transmission being installed to an internal combustion engine equipped with engine control means for controlling output torque of the engine according to vehicle driving conditions, said control system comprising:

driving condition monitor means for monitoring vehicle driving conditions;

control parameter determination means for determining the number of operating cylinders of the engine as an engine control parameter, based on which the engine control means controls output torque of the engine, according to vehicle driving conditions detected by said driving condition monitor means, and for correcting said number of operating cylinders when said driving condition monitor means detects specific vehicle driving conditions which necessitate a drop in output torque of the engine; and pressure regulation means for regulating line pressure of the hydraulic control circuit according to output torque of the engine determined based on said number of operating cylinders, while said engine control means controls output torque of the engine based on said corrected number of operating cylinders, during an occurrence of said specific vehicle driving conditions.

11. A control system as defined in claim 10, wherein said control driving condition monitor means comprises a speed sensor to monitor a wheel speed in rotation of each of driving wheels of the vehicle and detects an occurrence of slippage of said driving wheels as said specific driving condition based on said wheel speeds.

12. A control system as defined in claim 10, wherein said pressure regulation means fixes said line pressure at a specified level during execution of control of said engine output torque while said driving condition monitor means detects said specific vehicle driving conditions.

13. A control system as defined in claim 10, wherein said pressure regulation means fixes said line pressure at a level lower than a level at a point of time before execution of control of said engine output torque and higher than a level to be developed according to a drop in said engine output torque during execution of control of said engine output torque.

14. A control system as defined in claim 10, wherein said pressure regulation means gradually increases said line pressure dropped according to a drop in said engine output torque during execution of control of said engine output torque.

15. A control system for controlling an automatic transmission having a plurality of friction coupling elements which are selectively locked and unlocked by means of a hydraulic control circuit to place the automatic transmission into desired gears, said automatic transmission being installed to an internal combustion engine of a type executing control of engine output torque to cause and control a drop in engine output torque according to vehicle driving conditions, said control system comprising:

driving condition monitor means for monitoring vehicle driving conditions;

control parameter determination means for determining an engine control parameter, based on which the engine control means controls output torque of the engine, according to vehicle driving conditions detected by said driving condition monitor means, and for correcting said engine control parameter when said driving condition monitor means detects said specific vehicle driving conditions which necessitate a drop in output torque of the engine; and pressure regulation means for regulating line pressure of the hydraulic control circuit at a point of time immediately before termination of said control of a drop in engine output torque to a level higher than a level corresponding to engine output torque under said specific vehicle driving conditions so as thereby to admit an increase in said line pressure without a delay in regard to an increase in engine output torque when said control of a drop in engine output torque terminates following a disappearance of said specific vehicle driving conditions.

16. A control system for controlling an automatic transmission having a plurality of friction coupling elements which are selectively locked and unlocked by means of a hydraulic control circuit to place the automatic transmission into desired gears, said automatic transmission being installed to an internal combustion engine of a type executing control of ignition timing of the engine to cause and control a drop in engine output torque under specific vehicle driving conditions, said control system comprising:

driving condition monitor means for monitoring vehicle driving conditions;

control parameter monitor means for monitoring ignition timing and opening of an engine throttle; and pressure regulation means for regulating line pressure of the hydraulic control circuit based on said opening of said engine throttle while said driving condition monitor means detects said specific vehicle driving conditions and based on said ignition timing of said engine while said driving condition monitor means detects vehicle driving conditions other than said specific vehicle driving conditions.

* * * * *